(12) United States Patent
Rakshit et al.

(10) Patent No.: US 9,332,003 B2
(45) Date of Patent: May 3, 2016

(54) SYSTEMS AND METHODS FOR DISCOVERING WEBSITE CERTIFICATE INFORMATION

(71) Applicant: Symantec Corporation, Mountain View, CA (US)

(72) Inventors: Samir Kumar Rakshit, Vijayawada (IN); Vasantha Kumar Parameshwarappa, Bangalore (IN)

(73) Assignee: Symantec Corporation, Mountain View, CA (US)

( * ) Notice: Subject to any disclaimer, the term of this patent is extended or adjusted under 35 U.S.C. 154(b) by 150 days.

(21) Appl. No.: 14/269,082

(22) Filed: May 3, 2014

(65) Prior Publication Data

US 2015/0271171 A1 Sep. 24, 2015

(30) Foreign Application Priority Data

Mar. 20, 2014 (IN) .............................. 358/KOL/2014

(51) Int. Cl.
*H04L 29/06* (2006.01)

(52) U.S. Cl.
CPC ............ *H04L 63/0823* (2013.01); *H04L 63/168* (2013.01)

(58) Field of Classification Search
None
See application file for complete search history.

(56) References Cited

U.S. PATENT DOCUMENTS

| | | | | |
|---|---|---|---|---|
| 7,594,107 | B1 * | 9/2009 | Parkhill | H04L 63/0823 713/156 |
| 2006/0143442 | A1 * | 6/2006 | Smith | H04L 63/0823 713/156 |

(Continued)

OTHER PUBLICATIONS

"How Well Do You Know SSL?", https://www.ssllabs.com/, as accessed on Feb. 12, 2014, Qualys SSL Labs, Qualys Inc., (2009).

*Primary Examiner* — Kaveh Abrishamkar
(74) *Attorney, Agent, or Firm* — ALG Intellectual Property, LLC

(57) ABSTRACT

The disclosed computer-implemented method for discovering website certificate information may include (1) receiving, from a plurality of computing devices within a community of users, information that identifies the certificate statuses of websites visited by the computing devices, (2) identifying, by analyzing the information, at least one issue with the certificate status of at least one website visited by at least one of the computing devices, and (3) performing at least one remedial action in an attempt to correct the issue with the certificate status of the website. Various other methods, systems, and computer-readable media are also disclosed.

20 Claims, 6 Drawing Sheets

(56) References Cited

U.S. PATENT DOCUMENTS

| | | | |
|---|---|---|---|
| 2008/0059380 A1* | 3/2008 | Bleahen | G06Q 20/04 705/67 |
| 2008/0060062 A1* | 3/2008 | Lord | G06F 21/33 726/5 |
| 2010/0091994 A1* | 4/2010 | Schiefelbein | H04L 9/3273 380/277 |
| 2011/0213963 A1* | 9/2011 | Wnuk | H04L 9/3268 713/158 |
| 2013/0174263 A1* | 7/2013 | Nunez Di Croce | H04L 63/1433 726/25 |
| 2013/0198511 A1* | 8/2013 | Yoo | H04L 63/0823 713/156 |
| 2014/0157394 A1* | 6/2014 | Koonjbearry | H04L 63/1483 726/10 |
| 2014/0283105 A1* | 9/2014 | Trevor | G06F 21/10 726/27 |
| 2014/0337424 A1* | 11/2014 | Lee | H04L 63/0823 709/204 |
| 2015/0074390 A1* | 3/2015 | Stoback | H04L 63/1483 713/156 |
| 2015/0235035 A1* | 8/2015 | Tseitlin | G06F 21/604 707/785 |

\* cited by examiner

| Domain Name | Organization Name | Trust Seal Configured? | Trust-Seal Status | Certificate Version | Cipher Suite | Current/Previous Customer? | Expiration Date |
|---|---|---|---|---|---|---|---|
| xyz.com | XYZ Corp. | N | No seal found | TLS 1.1 | AES_128_GCM, ECDHE_RSA | Y/Y | Jan. 1, 2015 |
| ce.net | CE, LLC. | Y | Good | TLS 1.2 | RC4_124, MD5 | N/Y | Apr. 1, 2014 |
| mes.org | M.E.S. | Y | Old seal found | TLS 1.0 | AES_128_GCM, ECDHE_RSA | N/N | Mar. 2016 |

Certificate Data
122 ically, the instance application identifies and
SYSTEMS AND METHODS FOR DISCOVERING WEBSITE CERTIFICATE INFORMATION

BACKGROUND

Website certificates, such as Secure Sockets Layer certificates, represent an important part of e-commerce and Internet security. For example, a website certificate issued by a Certificate Authority may both assure visitors of a particular website that the website is authentic (i.e., not a phishing web site) and may enable visitors to securely communicate with the website (via, e.g., the Hypertext Transfer Protocol Secure protocol).

Because the field of website certificates is constantly evolving, Certificate Authorities may attempt to proactively identify issues with the website certificates used by their current customers. For example, some Certificate Authorities may use web crawlers to access and gather information from their customers' websites that may be helpful in identifying misconfigured and/or expired certificates. Unfortunately, web crawlers often require a significant amount of computing power and bandwidth, are expensive, and are often unable to successfully access websites that require user input (such as websites that require that users complete a login process or complete a human-verification test, such as a CAPTCHA).

Accordingly, the instance application identifies and addresses a need for additional and improved systems and methods for discovering website certificate information.

SUMMARY

As will be described in greater detail below, the instant disclosure describes various ways to leverage existing computing devices within a community of users (such as the user base of a security software publisher) to automatically discover and remediate website certificate issues. In one example, a computer-implemented method for performing such a task may include (1) receiving, from one or more computing devices within a community of users, information that identifies the certificate statuses of websites visited by the computing devices, (2) identifying, by analyzing the information, at least one issue with the certificate status of at least one website visited by at least one of the computing devices, and then (3) performing at least one remedial action in an attempt to correct the issue with the certificate status of the website.

In some examples, the method may include receiving the information from existing security software installed on the computing devices. In addition, at least one of the computing devices may obtain the information by (1) attempting to connect to the website a plurality of times and then (2) using a different cipher suite and/or cryptographic protocol version during each connection attempt.

In one embodiment, the systems described herein may identify the issue with the certificate status of the website by determining that the website's certificate is misconfigured, determining that a trust seal utilized by the website is misconfigured, determining that the website's certificate has expired, determining that the website's certificate currently falls within a renewal window, determining that the website does not use a specific type of certificate, and/or determining that the website fails to utilize a certificate in connection with a login function provided by the website.

In one example, the step of analyzing the information that identifies the certificate statuses of the websites visited by the computing devices may include analyzing a cipher suite specified by the website's certificate, analyzing a certificate chain associated with the website's certificate, and/or analyzing a cryptographic protocol utilized by the website's certificate. In this example, the systems described herein may determine that the website's certificate has been revoked and/or that at least one certificate in the certificate chain has been revoked.

In one embodiment, the step of analyzing the information that identifies the certificate statuses of the websites visited by the computing devices may be performed by the computing devices themselves. In addition, the step of performing the remedial action may include correctly configuring the website's certificate and/or correctly configuring a trust seal utilized by the website.

Additionally or alternatively, the step of performing the remedial action may include notifying an administrator of the website that the website's certificate has expired, that the website's certificate currently falls within a renewal window, that the website's certificate has been revoked, that at least one certificate in a certificate chain associated with the website's certificate has been revoked, that the website's certificate is misconfigured, that a trust seal utilized by the website is misconfigured, and/or that the website fails to utilize a certificate in connection with a login function provided by the website. In addition, the step of performing the remedial action may include providing an administrator of the website with an opportunity to renew the website's certificate and/or purchase a new website certificate.

In one example, a system for implementing the above-described method may include (1) a communication module, stored in memory, that receives, from one or more computing devices within a community of users, information that identifies the certificate statuses of websites visited by the computing devices, (2) an identification module, stored in memory, that identifies, by analyzing the information, at least one issue with a certificate status of at least one website visited by at least one of the computing devices, (3) a remediation module, stored in memory, that performs at least one remedial action in an attempt to correct the issue with the certificate status of the website, and (4) at least one processor configured to execute the communication module, the identification module, and the remediation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, from one or more computing devices within a community of users, information that identifies the certificate statuses of websites visited by the computing devices, (2) identify, by analyzing the information, at least one issue with a certificate status of at least one website visited by at least one of the computing devices, and (3) perform at least one remedial action in an attempt to correct the issue with the certificate status of the website.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Figure 1:
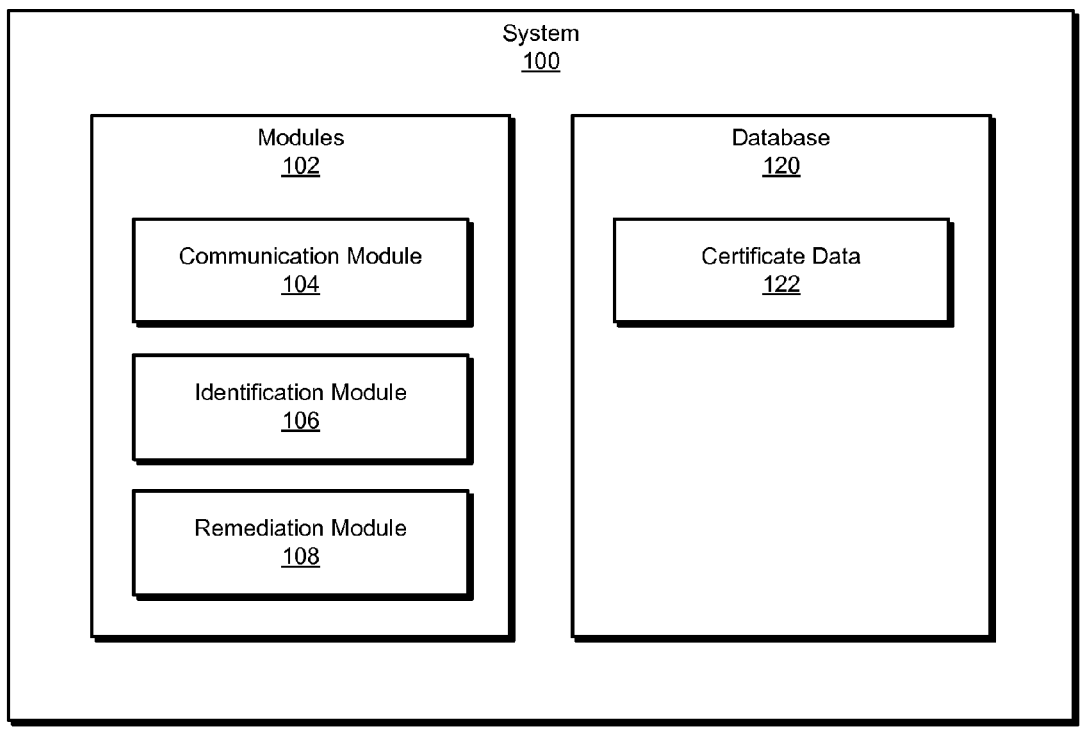
FIG. 1 is a block diagram of an exemplary system for discovering website certificate information.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for discovering website certificate information. As will be explained in greater detail below, the systems and methods described herein may automatically gather, from an existing community of computing devices, information that identifies the certificate statuses of the websites visited by these devices. By doing so, the systems and methods described herein may identify certificate issues experienced by these websites and/or identify potential customers without having to devote dedicated computing resources to performing this task. In addition, since the users of these existing computing devices may successfully access websites that require user input (such as websites that require that users complete a login process or a human-verification test, such as a CAPTCHA), the disclosed systems and methods may gather information from websites that traditional web crawlers may be unable to access. As such, the disclosed systems and methods may both improve the overall accuracy and/or efficiency of certificate management systems and reduce costs.

Figure 2:
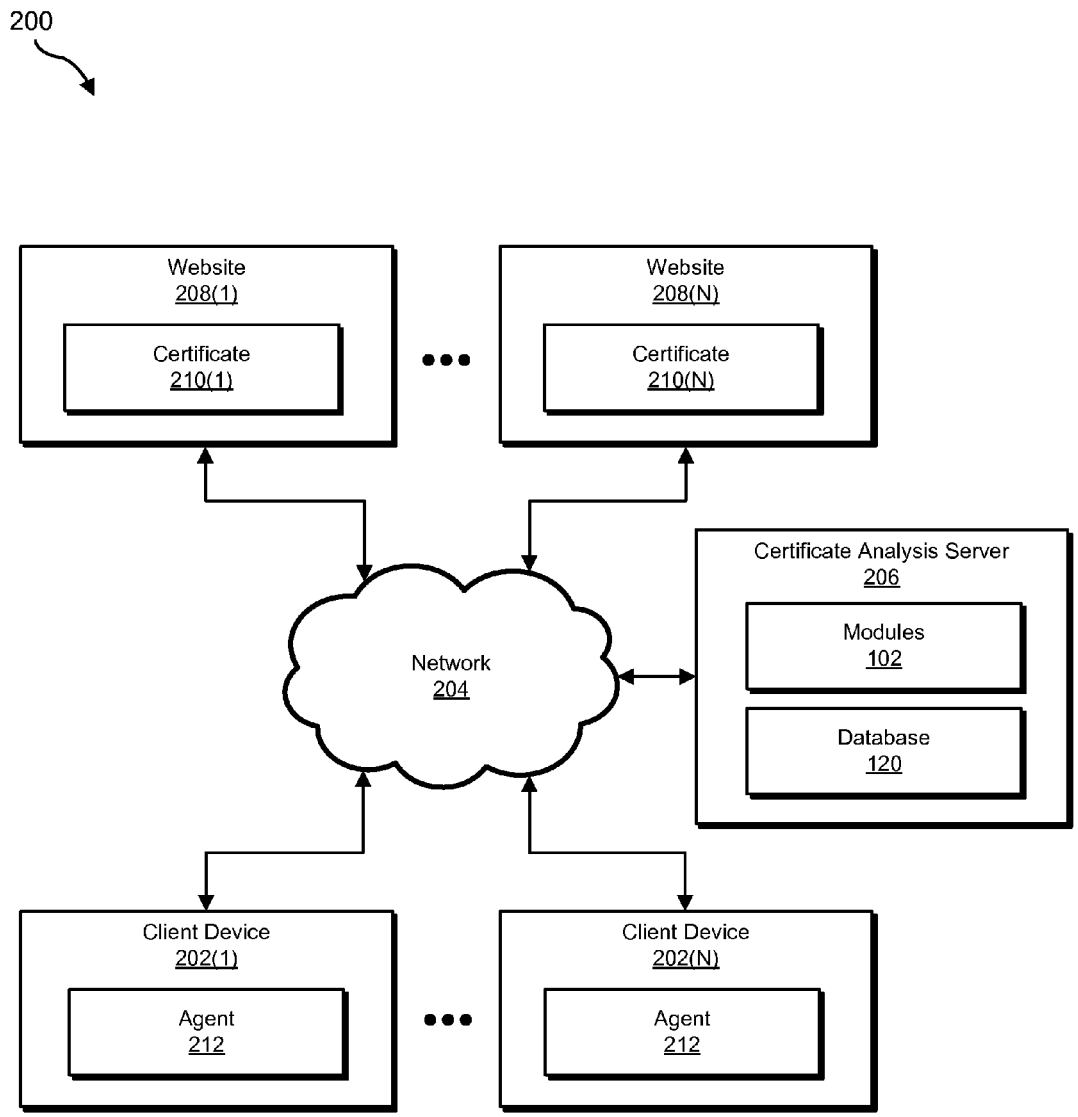
FIG. 2 is a block diagram of an additional exemplary system for discovering website certificate information.

The following will provide, with reference to FIGS. 1-2, detailed descriptions of exemplary systems for automatically discovering website certificate information. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for discovering website certificate information. As illustrated in this figure, exemplary system 100 may include one or more modules 102 for performing one or more tasks. For example, and as will be explained in greater detail below, exemplary system 100 may include a communication module 104 that receives, from one or more computing devices within a community of users, information that identifies the certificate statuses of websites visited by the computing devices. Exemplary system 100 may also include an identification module 106 that identifies, by analyzing the certificate status information, at least one issue with a certificate status of at least one website visited by at least one of the computing devices.

In addition, and as will be described in greater detail below, exemplary system 100 may include a remediation module 108 that performs at least one remedial action in an attempt to correct the issue with the certificate status of the website. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., client devices 202(1)-(N) and/or certificate analysis server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store certificate data 122. Examples of certificate data 122 include, but are not limited to, information that identifies how a certificate is configured (including, e.g., the cryptographic protocol type utilized by the certificate, the certificate's type and/or version, the issuer of the certificate, usage constraints of the certificate, etc.), a certificate's expiration date, a certificate's renewal window, and/or whether a website fails to utilize a certificate in connection with a login function provided by the website.

Database 120 may represent portions of a single database or computing device or a plurality of databases or computing devices. For example, database 120 may represent a portion of certificate analysis server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as certificate analysis server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include one or more client devices 202(1)-(N) in communication with a certificate analysis server 206 via a network 204. In one example, client devices 202(1)-(N) may be programmed with one or more of modules 102 (as represented by agent 212). Additionally or alternatively, certificate analysis server 206 may be programmed with one or more of modules 102 and/or may store all or a portion of the data in database 120.

In one embodiment, one or more of modules 102 from FIG. 1 may, when executed by at least one processor of client devices 202(1)-(N) and/or certificate analysis server 206, enable client devices 202(1)-(N) and/or certificate analysis server 206 to discover certificate information. For example, and as will be described in greater detail below, communication module 104 may cause certificate analysis server 206 to receive, from an agent 212 deployed on client devices 202 (1)-(N), information that identifies the certificate statuses of websites 208(1)-(N) visited by client devices 202(1)-(N). In addition, identification module 106 may cause certificate analysis server 206 to identify, by analyzing the information, at least one issue with the certificate status of at least one website (e.g., website 208(1)) visited by client devices 202 (1)-(N). Finally, remediation module 108 may perform at least one remedial action in an attempt to correct the issue with the certificate status of website 208(1).

Client devices 202(1)-(N) generally represent any type or form of computing device capable of reading computer-executable instructions. Examples of client devices 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device. In some examples, client devices 202(1)-(N) may form part of a computing community, such as the user base of a security software publisher.

Certificate analysis server 206 generally represents any type or form of computing device that is capable of analyzing certificate information. Examples of certificate analysis server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing devices 202(1)-(N), certificate analysis server 206, and/or websites 208(1)-(N).

Figure 3:
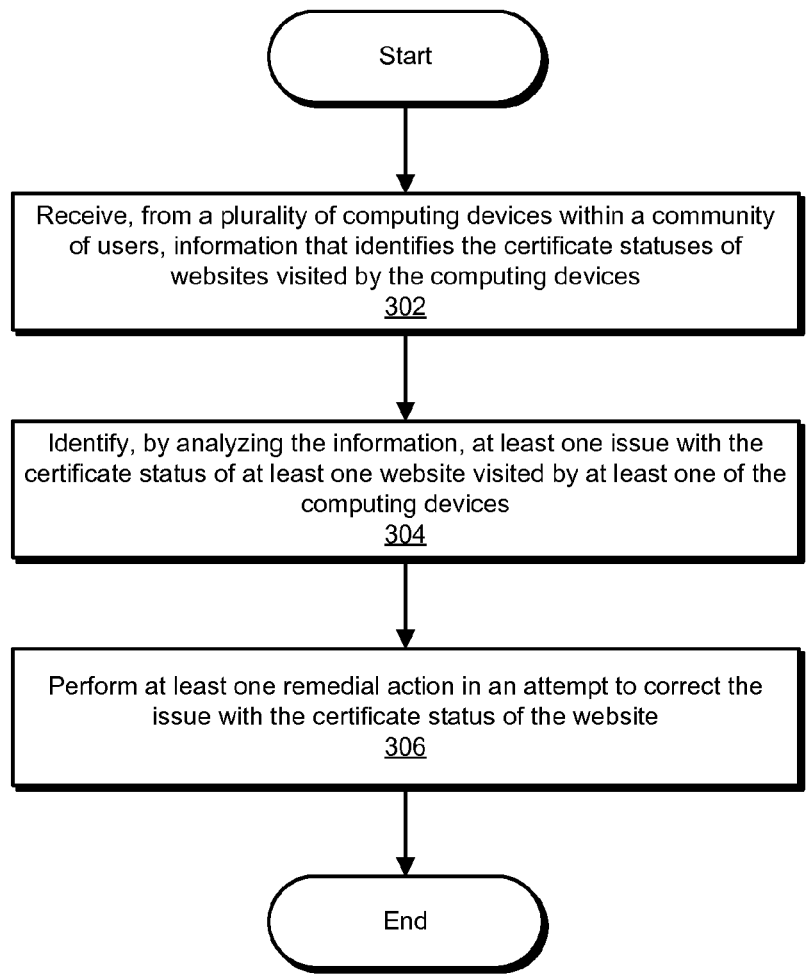
FIG. 3 is a flow diagram of an exemplary method for discovering website certificate information.

FIG. 3 is a flow diagram of an exemplary computer-implemented method 300 for discovering website certificate information. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may receive, from a plurality of computing devices within a community of users, information that identifies the certificate statuses of websites visited by the computing devices. For example, communication module 104 may, as part of certificate analysis server 206 in FIG. 2, receive information from client devices 202(1)-(N) that identifies the certificate statuses of websites 208(1)-(N) visited by client devices 202(1)-(N).

The term "website certificate" (or simply "certificate"), as used herein, generally refers to any type or form of electronic document used to verify the identity of an entity. In some examples, website certificates may accomplish this by using a digital signature (from, e.g., a Certificate Authority) to bind the public half of an asymmetric cryptographic key pair associated with an entity with information that uniquely identifies the entity. Examples of website certificates include, without limitation, Transport Layer Security (TLS) certificates, Secure Sockets Layer (SSL) certificates (including Extended Validation SSL (EV SSL) certificates, Organization Validation SSL (OV SSL) certificates, and Domain Validation SSL (DV SSL) certificates), etc. When installed on a web server, website certificates may facilitate secure connections between a web server and a program that communicates over a network, such as via the Hypertext Transfer Protocol Secure (HTTPS) protocol.

In addition, the term "certificate status," as used herein, generally refers to the state and/or condition of a website certificate (and/or a website as it relates to a website certificate). Examples of certificate statuses include, without limitation, whether a website currently employs a website certificate, whether a website employs a particular type of website certificate, whether a website certificate is properly configured, whether a third-party trust seal or indicator is properly configured, whether a website certificate has expired or is about to expire, and/or any other state or condition related to a website certificate.

Similarly, the phrase "information that identifies the certificate statuses of websites" (or simply "certificate status information"), as used herein, generally refers to any information that may be associated with and/or used to ascertain the certificate status of a website. In some examples, this certificate status information may identify various characteristics of a website. For example, certificate status information may identify a website's domain name and/or Internet Protocol (IP) address, the name or address of a registrar associated with a website, the creation or expiration date of a website's domain name, whether the website currently employs any website certificates, whether the website employs any third-party trust indicators or seals (such as a NORTON SECURED SEAL) that demonstrate the trustworthiness of the website, and/or any other information that may be helpful in ascertaining the website's certificate status.

If the website employs any website certificates, then this certificate status information may also identify various characteristics of these website certificates, such as the type of website certificate employed by the website (e.g., SSL, TLS, etc.), the version of the website certificate employed by the website (e.g., TLS 1.2, SSL 3.0, etc.), the cipher suite specified by the website certificate (e.g., AES_128, RC4_124, etc.), whether the website certificate is part of a certificate chain (and if so, identifying information for each certificate in the chain, including whether any of the certificates in the chain have been revoked), whether the website certificate has been revoked, the expiration date or renewal window of the website certificate, the name of a Certificate Authority responsible for issuing the website certificate, and/or any other information associated with the website certificate that may be helpful in ascertaining the website's certificate status.

The term "revoked" in reference to website certificates, as used herein, generally refers to the practice of placing a website certificate on a list of certificates that should no longer be trusted. A certificate may be revoked for various reasons. A certificate may be revoked because the private half of an asymmetric cryptographic key pair associated with an entity has been compromised, the certificate authority that issued the certificate (and therefore, the certificate chain of the website certificate) has been compromised, the website using the certificate has been compromised, the certificate was issued by a certificate authority to an untrusted entity, or any other reason that users should not trust the entity in possession of the website certificate.

The term "certificate chain," as used herein, generally refers to all the certificates needed to certify the authenticity of a website certificate. This chain may include, but is not limited to, the end website certificate, zero or more intermediary certificates of certificate authorities, and/or the certificate of a root certificate authority that the certificates in the certificate chain trust. In some examples, one or more certificate authorities in the certificate chain may hold a certificate issued by a certificate authority one level higher above itself. In some examples, the root certificate authority may issue a certificate for itself.

Similarly, if the website employs any third-party trust seals or indicators that demonstrate the trustworthiness of the website, then this certificate status information may also identify various characteristics of these third-party seals, such as the type of trust seal employed by the website (e.g., NORTON SECURED SEAL), the version of the trust seal employed by the website (e.g., whether the trust seal is text-based, image-based, or represented by an animation or splash screen), the name of the third party that is responsible for issuing the trust seal (e.g., SYMANTEC), and/or any other information associated with the trust seal that may be helpful in ascertaining the website's certificate status.

The systems described herein may receive information that identifies the certificate statuses of websites visited by computing devices within a community in a variety of ways. In one example, communication module 104 may, as part of certificate analysis server 206, receive this information from agents (e.g., agent 212) installed on computing devices (e.g., client devices 202(1)-(N)) within a community of users, such as the user base of a security software publisher. In this example, agent 212 (which may, for example, represent a portion of existing security software installed on computing devices 202(1)-(N)) may, as computing devices 202(1)-(N) visit various websites during the course of their normal operation, gather information about these websites that may be useful in identifying their certificate statuses. Agent 212 may then transmit this information to certificate analysis server 206 to enable certificate analysis server 206 to analyze the certificate statuses of these websites.

Agent 212 may gather certificate status information from websites visited by client devices 202(1)-(N) in a variety of ways. In one example, agent 212 may passively identify website connections established by client devices 202(1)-(N), generate certificate status information for these websites based on these connections, and then send this certificate status information to certificate analysis server 206 for analysis. Additionally or alternatively, agent 212 may (on behalf of client devices 202(1)-(N)) actively create website connections with various websites, generate certificate status information for these websites based on these connections, and then send this certificate status information to certificate analysis server 206 for analysis.

For example, agent 212 may, while running as a background service on computing device 202(1), attempt to connect to website 208(1) multiple times (either sequentially or simultaneously). In this example, agent 212 may use a different cipher suite (e.g., AES_128, RC4_124, etc.) and/or cryptographic protocol version (e.g., TLS 1.2, SSL 3.0, etc.) during each connection attempt. By doing so, agent 212 may be able to determine, based on the success or failure of each connection attempt, how website 208(1) and/or certificate 210(1) is configured.

In one example, certificate analysis server 206 may proactively request certificate status information from client devices 202(1)-(N). Additionally or alternatively, client devices 202(1)-(N) may proactively send certificate status information to certificate analysis server 206. For example, agent 212 may send certificate status information to certificate analysis server 206 each time agent 212 gathers information about a website certificate. Alternatively, agent 212 may periodically send certificate status information to certificate analysis server 206.

Returning to FIG. 3, at step 304 the systems described herein may identify, by analyzing the information received in step 302, at least one issue with the certificate status of at least one website visited by at least one of the computing devices. For example, identification module 106 may, as part of certificate analysis server 206 in FIG. 2, identify an issue with the certificate status of website 208(1) based on an analysis of the certificate status information received from agent 212 on computing devices 202(1)-(N).

The systems described herein may perform step 304 in a variety of ways. In one example, identification module 106 may identify issues with the certificate statuses of websites visited by computing devices 202(1)-(N) by aggregating, sorting, and analyzing the various certificate status information received from agent 212 on computing devices 202(1)-(N). In some examples, identification module 106 may perform this analysis on certificate analysis server 206. Additionally or alternatively, identification module 106 may perform this analysis on computing devices 202(1)-(N) (i.e., identification module 106 may be installed and/or may execute on computing devices 202(1)-(N) as part of, e.g., a peer-to-peer network).

Examples of the types of issues that identification module 106 may detect or identify through the analysis process of step 304 include, without limitation, that a website does not currently employ or utilize a website certificate, that a website's certificate is currently misconfigured (due to, e.g., using an out-of-date or incorrect cipher suite or cryptographic protocol, due to missing intermediate certificate information required to complete a certificate chain, etc.), that a website's third-party trust seal is currently misconfigured (due to, e.g., using an out-of-date or incorrect version), that a website's certificate has been revoked, has expired, or is about to expire (due to, e.g., falling within a renewal window), that an intermediate certificate in the certificate chain of a website's certificate has been revoked, that a website fails to utilize a certificate in connection with login functionality provided by the website, that a website does not use a particular type of certificate (such as a particular brand of certificate offered by a certificate authority that maintains certificate analysis server 206), and/or any other information that may affect the functionality or status of a website or its associated certificates and/or that may be used as a tool to generate or identify potential sales leads or marketing opportunities.

Figure 4:
FIG. 4 is a block diagram of an exemplary database containing certificate information gathered from computing devices within a community of users.

FIG. 4 is an illustration of the types of certificate data that identification module 106 may identify by aggregating, sorting, and analyzing the certificate status information received from agent 212 on computing devices 202(1)-(N). For example, identification module 106 may, by analyzing certificate data 122, determine that the domain "xyz.com" does not currently utilize a third-party trust seal or indicator (as shown by the field "Trust-Seal Status: No seal found"), is utilizing an out-of-date website certificate (as shown by the field "Certificate Version: TLS 1.1"), and is utilizing a website certificate that is set to expire within the next year. Similarly, identification module 106 may determine that the domain "ce.net" is not a current customer (but was a customer previously, as shown by the field "Current/Previous Customer? N/Y"), is utilizing a less-than-optimal cipher suite (as shown by the field "Cipher Suite: RC4_124, MD5"), and is utilizing a website certificate that is set to expire within the next month (as shown by the field "Expiration Date: Apr. 1, 2014"). Identification module 106 may also determine that the domain "mes.org" is utilizing an old or out-of-date third-party trust seal or indicator (as shown by the field "Trust-Seal Status: Old seal found"), is utilizing an out-of-date website certificate (as shown by the field "Certificate Version: TLS 1.0"), and is not a current customer (as shown by the field "Current/Previous Customer? N/N").

Returning to FIG. 3, at step 306 the systems described herein may perform at least one remedial action in an attempt to correct the issue with the certificate status of the website identified in step 304. For example, remediation module 108 may, as part of certificate analysis server 206 in FIG. 2, perform a remedial action in an attempt to correct an issue with the certificate status of website 208(1).

The term "remedial action," as used herein, generally refers to any act designed to correct, mitigate, and/or inform another entity of an issue with the certificate status of a website. The systems described herein may perform a variety of remedial actions based on the issues identified in step 304. Examples of the types of remedial actions that remediation module 108 may perform include, without limitation, correctly configuring (or instructing an administrator to correctly configure) a website's certificate (by, e.g., deploying an up-to-date or more secure cipher suite or cryptographic protocol, supplying missing intermediate certificate information required to complete a certificate chain, etc.) and/or correctly configuring (or instructing an administrator to correctly configure) a trust seal or indicator utilized by the website (by, e.g., deploying an up-to-date or correct version). Similarly, remediation module 108 may notify an administrator of a website that the website's certificate has been revoked, has expired, or is about to expire (i.e., the website's certificate currently falls within a renewal window), that the website's certificate is misconfigured (due to, e.g., using an out-of-date or less-than-optimal cipher suite or cryptographic protocol, due to missing intermediate certificate information required to complete a certificate chain, etc.), and/or that the website fails to utilize a certificate in connection with a login function provided by the website.

For example, and with reference to the example illustrated in FIG. 4, remediation module 108 notify an administrator of the domain "xyz.com" that this website does not currently utilize a third-party trust seal or indicator (as shown by the field "Trust Seal Configured? N"), is utilizing an out-of-date website certificate (as shown by the field "Certificate Version: TLS 1.1"), and is utilizing a website certificate that is set to expire within the next year. Similarly, remediation module 108 may notify an administrator of the domain "ce.net" that this website is utilizing a less-than-optimal cipher suite (as shown by the field "Cipher Suite: RC4_124, MD5") and is utilizing a website certificate that is set to expire within the next month. Finally, remediation module 108 may notify an administrator of the domain "mes.org" that this website is utilizing an old or out-of-date third-party trust seal or indicator (as shown by the field "Trust-Seal Status: Old seal found") and is utilizing an out-of-date website certificate (as shown by the field "Certificate Version: TLS 1.0").

In some examples, remediation module 108 may also leverage certificate data 122 to identify potential sales leads and marketing opportunities. For example, remediation module 108 may, by analyzing certificate data 122, identify websites that are not current customers (i.e., websites that do not currently utilize a particular type or brand of certificate offered by a certificate authority). Similarly, remediation module 108 may identify previous customers (which often represent particularly promising sales leads) and/or potential customers that have a current or expected need (e.g., websites whose certificates have already expired, are about to expire, and/or are within a renewal window).

In some examples, remediation module 108 may use this information to create targeted or customized marketing communications and/or offerings. For example, remediation module 108 may determine that the domain "ce.net" both represents a previous customer and is currently within its certificate renewal window. As such, remediation module 108 may provide an administrator of this domain with an opportunity to purchase a website certificate at a reduced rate. Similarly, since the domain "mes.org" is not a current customer, remediation module 108 may provide an administrator of this domain with an opportunity to purchase a website certificate.

As detailed above, by automatically gathering, from an existing community of computing devices, information that identifies the certificate statuses of the websites visited by these devices, the systems and methods described herein may enable certificate administrators to quickly and easily identify potential customers and/or website certificate issues without having to manually gather this information via dedicated programs and/or computing devices. This may, in turn, improve the accuracy and/or efficiency of certificate management systems and/or reduce overall costs.

Figure 5:
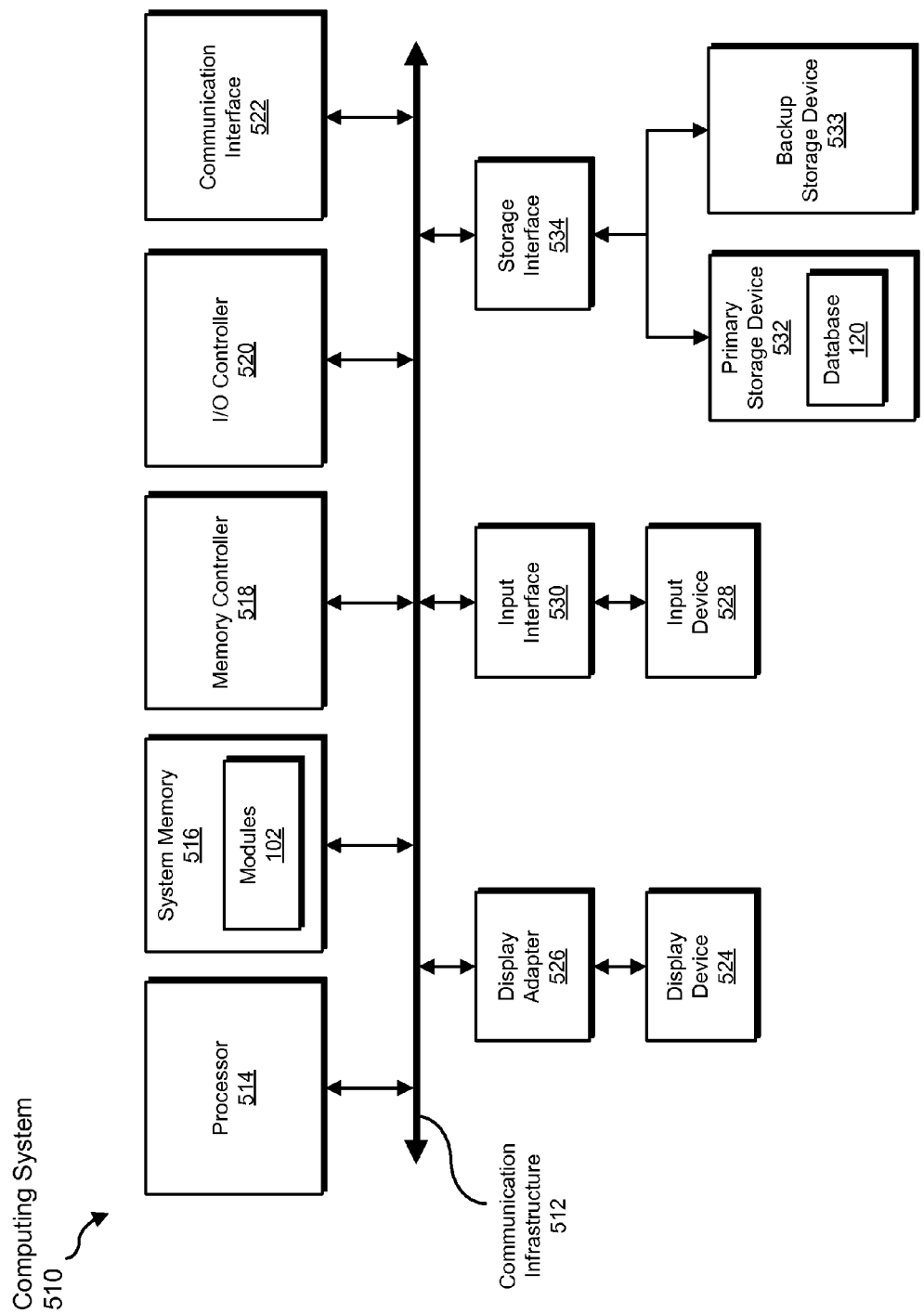
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
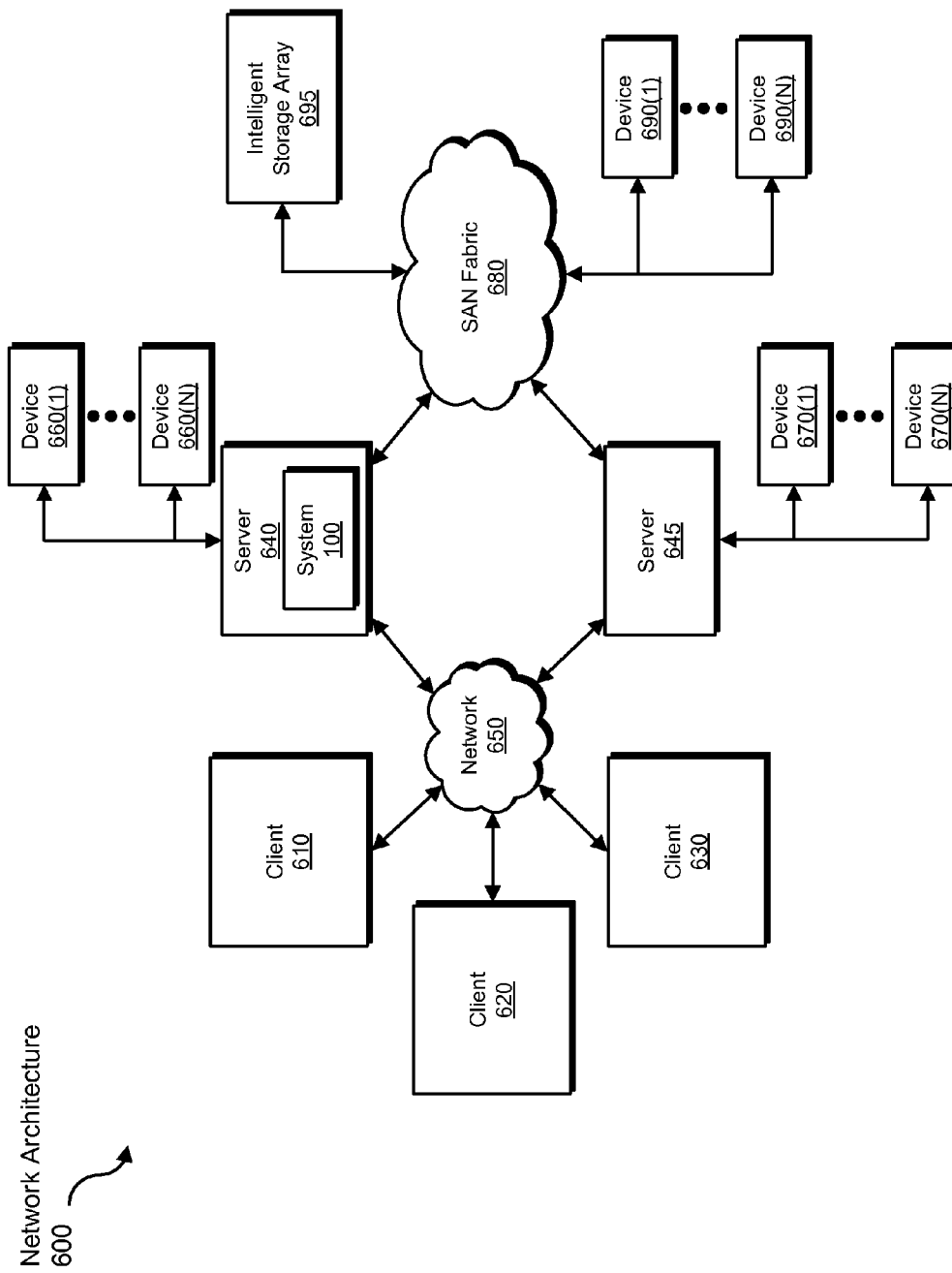
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for discovering website certificate information.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive website certificate information from multiple computing devices within a community of users, transform this information into an identification of certificate issues experienced by various websites, and then perform various remedial actions in an attempt to correct the issues identified as a result of the transformed information. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for discovering website certificate information, at least a portion of the method being performed by a computing device comprising at least one processor, the method comprising:
   receiving, from a plurality of computing devices within a community of users, information that identifies certificate statuses of websites visited by the computing devices, wherein each of the computing devices comprises an instance of the same security software;
   identifying, by analyzing the information received from the plurality of computing devices within the community of users, at least one issue with a certificate status of at least one website visited by at least one of the computing devices; and
   performing at least one remedial action in an attempt to correct the issue with the certificate status of the website.

2. The method of claim 1, wherein receiving the information that identifies the certificate statuses of the websites visited by the computing devices comprises receiving the information from the instances of the security software.

3. The method of claim 1, wherein at least one of the computing devices obtained the information by:
   attempting to connect to the website a plurality of times; and
   using a different cipher suite and/or cryptographic protocol version during each connection attempt.

4. The method of claim 1, wherein identifying the issue with the certificate status of the website comprises at least one of:
   determining that the website's certificate is misconfigured;
   determining that a trust seal utilized by the website is misconfigured;
   determining that the website's certificate has expired;
   determining that the website's certificate currently falls within a renewal window;
   determining that the website does not use a specific type of certificate; and
   determining that the website fails to utilize a certificate in connection with a login function provided by the website.

5. The method of claim 1, wherein analyzing the information that identifies the certificate statuses of the websites visited by the computing devices comprises at least one of:
   analyzing a cipher suite specified by the website's certificate;
   analyzing a certificate chain associated with the website's certificate; and
   analyzing a cryptographic protocol utilized by the website's certificate.

6. The method of claim 5, wherein analyzing the certificate chain associated with the website's certificate comprises at least one of:
   determining that the website's certificate has been revoked; and
   determining that at least one certificate in the certificate chain has been revoked.

7. The method of claim 1, wherein the step of analyzing the information that identifies the certificate statuses of the websites visited by the computing devices is performed by the computing devices.

8. The method of claim 1, wherein performing the remedial action comprises at least one of:
   correctly configuring the website's certificate;
   correctly configuring a trust seal utilized by the website; and
   notifying an administrator of the website that at least one of:
   the website's certificate has expired;
   the website's certificate currently falls within a renewal window;
   the website's certificate has been revoked;
   at least one certificate in a certificate chain associated with the website's certificate has been revoked;
   the website's certificate is misconfigured;
   a trust seal utilized by the website is misconfigured; and
   the website fails to utilize a certificate in connection with a login function provided by the website.

9. The method of claim 1, wherein performing the remedial action comprises providing an administrator of the website with an opportunity to at least one of:
   renew the website's certificate; and
   purchase a new website certificate.

10. A system for discovering website certificate information, the system comprising:
   a communication module, stored in memory, that receives, from a plurality of computing devices within a community of users, information that identifies certificate statuses of websites visited by the computing devices, wherein each of the computing devices comprises an instance of the same security software;
   an identification module, stored in memory, that identifies, by analyzing the information received from the plurality of computing devices within the community of users, at least one issue with a certificate status of at least one website visited by at least one of the computing devices;
   a remediation module, stored in memory, that performs at least one remedial action in an attempt to correct the issue with the certificate status of the website; and
   at least one processor configured to execute the communication module, the identification module, and the remediation module.

11. The system of claim 10, wherein the communication module receives the information that identifies the certificate statuses of the websites visited by the computing devices from the instances of the security software.

12. The system of claim 10, wherein at least one of the computing devices obtained the information by:
   attempting to connect to the website a plurality of times; and
   using a different cipher suite and/or cryptographic protocol version during each connection attempt.

13. The system of claim 10, wherein the identification module identifies the issue with the certificate status of the website by at least one of:
   determining that the website's certificate is misconfigured;
   determining that a trust seal utilized by the website is misconfigured;
   determining that the website's certificate has expired;
   determining that the website's certificate currently falls within a renewal window;
   determining that the website does not use a specific type of certificate; and
   determining that the website fails to utilize a certificate in connection with a login function provided by the website.

14. The system of claim 10, wherein the identification module analyzes the information that identifies the certificate statuses of the websites visited by the computing devices by at least one of:

analyzing a cipher suite specified by the website's certificate;

analyzing a certificate chain associated with the website's certificate; and analyzing a cryptographic protocol utilized by the website's certificate.

15. The system of claim 14, wherein the identification module analyzes the certificate chain associated with the website's certificate by at least one of:

determining that the website's certificate has been revoked; and determining that at least one certificate in the certificate chain has been revoked.

16. The system of claim 10, wherein the identification module is installed on, and executed by, the computing devices.

17. The system of claim 10, wherein the remediation module performs the remedial action by at least one of:

correctly configuring the website's certificate;

correctly configuring a trust seal utilized by the website; and notifying an administrator of the website that at least one of:

the website's certificate has expired;

the website's certificate currently falls within a renewal window;

the website's certificate has been revoked;

at least one certificate in a certificate chain associated with the website's certificate has been revoked;

the website's certificate is misconfigured;

a trust seal utilized by the website is misconfigured; and the website fails to utilize a certificate in connection with a login function provided by the website.

18. The system of claim 10, wherein the remediation module performs the remedial action by providing an administrator of the website with an opportunity to at least one of:

renew the website's certificate; and purchase a new website certificate.

19. A non-transitory computer-readable medium comprising one or more computer-executable instructions that, when executed by at least one processor of a computing device, cause the computing device to:

receive, from a plurality of computing devices within a community of users, information that identifies certificate statuses of websites visited by the computing devices, wherein each of the computing devices comprises an instance of the same security software;

identify, by analyzing the information received from the plurality of computing devices within the community of users, at least one issue with a certificate status of at least one website visited by at least one of the computing devices; and perform at least one remedial action in an attempt to correct the issue with the certificate status of the website.

20. The non-transitory computer-readable medium of claim 19, wherein the computer-executable instructions, when executed by at least one processor of a computing device, further cause the computing device to:

determine that the website's certificate is misconfigured;

determine that a trust seal utilized by the website is misconfigured;

determine that the website's certificate has expired;

determine that the website's certificate currently falls within a renewal window;

determine that the website does not use a specific type of certificate; and determine that the website fails to utilize a certificate in connection with a login function provided by the website.

\* \* \* \* \*